US012773030B2

(12) United States Patent
Enami

(10) Patent No.: US 12,773,030 B2
(45) Date of Patent: Oct. 27, 2026

(54) SHEET ATTACHMENT STRUCTURE AND HELMET

(71) Applicant: SHOEI Co., Ltd., Tokyo (JP)

(72) Inventor: Kunio Enami, Tokyo (JP)

(73) Assignee: SHOEI Co., Ltd., Tokyo (JP)

( * ) Notice: Subject to any disclaimer, the term of this patent is extended or adjusted under 35 U.S.C. 154(b) by 0 days.

(21) Appl. No.: 18/869,809

(22) PCT Filed: May 23, 2023

(86) PCT No.: PCT/JP2023/019089
§ 371 (c)(1),
(2) Date: Nov. 26, 2024

(87) PCT Pub. No.: WO2023/234112
PCT Pub. Date: Dec. 7, 2023

(65) Prior Publication Data

US 2025/0311804 A1 Oct. 9, 2025

(30) Foreign Application Priority Data

May 30, 2022 (JP) ................................ 2022-087502

(51) Int. Cl.
*A42B 3/24* (2006.01)
*G02F 1/1343* (2006.01)
*H05B 3/84* (2006.01)

(52) U.S. Cl.
CPC ............... *A42B 3/245* (2013.01); *H05B 3/84* (2013.01); *G02F 1/13439* (2013.01)

(58) Field of Classification Search
CPC ........ A42B 3/245; H05B 3/84; G02F 1/13439
See application file for complete search history.

(56) References Cited

U.S. PATENT DOCUMENTS 5,694,650 A * 12/1997 Hong ........................ A42B 3/28
2/435
6,417,491 B1 * 7/2002 Taniuchi .................. H05B 3/84
219/528

(Continued)

FOREIGN PATENT DOCUMENTS

JP S62-29716 A 2/1987
JP 2001-020123 A 1/2001

(Continued)

OTHER PUBLICATIONS

International Search Report and Written Opinion dated Jul. 11, 2023, in connection with International Application No. PCT/JP2023/019089, with English translation.

*Primary Examiner* — Aiying Zhao
(74) *Attorney, Agent, or Firm* — Wolf, Greenfield & Sacks, P.C.

(57) ABSTRACT

This sheet attachment structure includes a shield provided with a through hole, a sheet member that covers the inner surface of the shield, and a retaining part for attaching the sheet member to the shield. The sheet member includes a recessed section that engages with the retaining part, and a first electrode and a second electrode that are arranged side by side in the thickness direction of the sheet member. The retaining part includes a first shaft part that fits with the through hole, a first terminal that makes contact with the first electrode, a second terminal that makes contact with the second electrode, and a second shaft part that engages with the recessed section. The first terminal is electrically connected to a first external wiring via the through hole, and the second terminal is electrically connected to a second external wiring via the through hole.

7 Claims, 12 Drawing Sheets

(56) References Cited

U.S. PATENT DOCUMENTS

| | | | | |
|---|---|---|---|---|
| 2005/0066427 | A1* | 3/2005 | Gafforio | A42B 3/24<br>2/422 |
| 2013/0129449 | A1* | 5/2013 | Ishikawa | F16B 5/10<br>411/509 |
| 2015/0272260 | A1* | 10/2015 | Ryan | B32B 37/12<br>156/60 |

FOREIGN PATENT DOCUMENTS

| | | | | | |
|---|---|---|---|---|---|
| JP | 2001181923 | A | * | 7/2001 | A42B 3/245 |
| JP | 2005-097823 | A | | 4/2005 | |
| JP | 2011-252258 | A | | 12/2011 | |

* cited by examiner

SHEET ATTACHMENT STRUCTURE AND HELMET

CROSS REFERENCE TO RELATED APPLICATIONS

This Application is a national stage filing under 35 U.S.C. 371 of International Patent Application Serial No PCT/JP2023/019089, filed May 23, 2023, which claims priority to Japanese application number 2022-087502, filed May 30, 2022. The entire contents of these applications are incorporated herein by reference in their entirety.

TECHNICAL FIELD

The present disclosure relates to a sheet attachment structure for attaching a sheet member to a shield and a helmet including the sheet attachment structure.

BACKGROUND ART

A helmet for a motorcycle includes a semispherical helmet body and a shield attached to the helmet body. The shield may be provided with a sheet member that is supplied with electric power and electrically controlled. Examples of such a sheet member include an anti-fogging sheet or a light-adjusting sheet. Patent Literature 1 describes an example of a structure in which a heater including two electrodes is attached to the inner surface of a shield using fastening means. Each electrode of the heater is supplied with electric power through the fastening means from an external power supply disposed at the side of the outer surface side of the shield (e.g., helmet body).

CITATION LIST

Patent Literature

Patent Literature 1: Japanese Laid-Open Patent Publication No. 2001-20123

SUMMARY OF INVENTION

Technical Problem

In the structure described above, current flows from one of the fastening means to another one of the fastening means. Thus, the fastening means are each connected to a wire used for a different polarity. In this case, one fastening means is arranged at one end of the shield, and another fastening means is arranged at the other end of the shield. As a result, the wire runs in a wide range from the single external power supply to the two ends of the shield. There is a need to simplify the wiring used to supply electric power to the sheet member.

Solution to Problem

In an aspect of the present disclosure, a sheet attachment structure includes a shield configured to be attached to a helmet body, a sheet member covering an inner surface of the shield, and a retainer configured to attach the sheet member to the shield. The shield includes a through hole to which the retainer is coupled. The sheet member includes a recess engaging with the retainer, and a first electrode and a second electrode. The first electrode and the second electrode are arranged in a thickness-wise direction of the sheet member on a periphery of the recess. The first electrode includes a first electrode surface. The second electrode includes a second electrode surface. The first electrode surface and the second electrode surface face in opposite directions. The retainer includes a first shaft fitted into the through hole, a first terminal in contact with the first electrode surface, a second terminal opposed to the first terminal and in contact with the second electrode surface, and a second shaft disposed between the first terminal and the second terminal and engaging with the recess. The first terminal is configured to be electrically connected through the through hole to a first external wire located outside the shield. The second terminal is configured to be electrically connected through the through hole to a second external wire located outside the shield.

In an aspect of the present disclosure, a helmet includes a helmet body, a shield attached to the helmet body, a sheet member covering an inner surface of the shield, a retainer configured to attach the sheet member to the shield, and a first external wire and a second external wire configured to supply electric power to the sheet member. The shield includes a through hole to which the retainer is coupled. The sheet member includes a recess engaging with the retainer, and a first electrode and a second electrode. The first electrode and the second electrode are arranged in a thickness-wise direction of the sheet member on a periphery of the recess. The first electrode includes a first electrode surface. The second electrode includes a second electrode surface. The first electrode surface and the second electrode surface face in opposite directions. The retainer includes a first shaft fitted into the through hole, a first terminal in contact with the first electrode surface, a second terminal opposed to the first terminal and in contact with the second electrode surface, and a second shaft disposed between the first terminal and the second terminal and engaging with the recess. The first external wire and the second external wire are located outside the shield. The first terminal is electrically connected through the through hole to the first external wire. The second terminal is electrically connected through the through hole to the second external wire.

DESCRIPTION OF EMBODIMENTS

An embodiment of a helmet having a sheet attachment structure will now be described with reference to FIGS. 1 to 19. In FIGS. 1 to 19, the frame of reference for the front, rear, left, right, upper, and lower side of the helmet is based on the perspective of a person wearing the helmet.

Helmet

Figure 1:
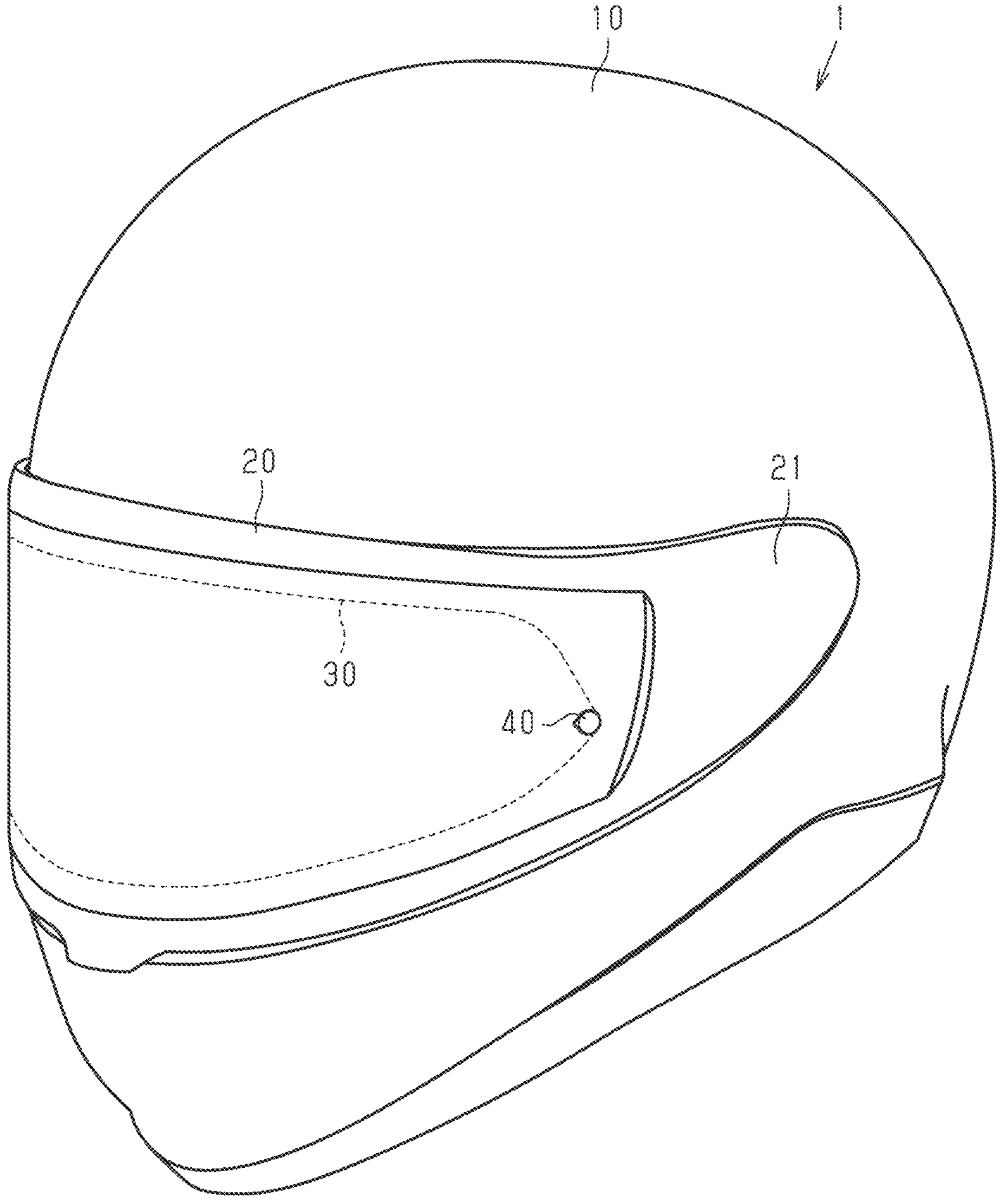
FIG. 1 is a perspective view of a helmet.

As shown in FIG. 1, a helmet 1 is, for example, a full-face type. The helmet 1 includes a helmet body 10 and a shield 20. The helmet 1 may include a liner and a cushioning inner pad accommodated in the helmet body 10. The liner is a shock absorber formed of a foamed resin. The inner pad enhances the close fit with the head of the wearer.

The helmet body 10 forms the outer shell of the helmet 1. The helmet body 10 is a semispherical resin member. The material of the helmet body 10 is selected from, for example, acrylonitrile-butadiene-styrene copolymer (ABS), polycarbonate (PC), fiber reinforced plastic (FRP), and the like. The helmet body 10 includes an insertion opening that is open downward to allow for insertion of the head of the wearer. The helmet body 10 includes a view opening that is open frontward to ensure the field of view of the wearer.

The shield 20 is a light-transmissive plate member. The shield 20 is curved in conformance with the curved shape of an outer surface of the helmet body 10. The shield 20 includes two attached portions 21 arranged on the left and right ends of the shield 20. The attached portions 21 are attached to the helmet body 10 so that the shield 20 shifts from a state in which the view opening is closed by the shield 20 to a state in which the shield 20 is pivotal upward along the outer surface of the helmet body 10. The shield 20 hampers entrance of rain, wind, and an object coming from the front into the helmet 1, thereby improving the visibility of the wearer.

A sheet member 30 is attached to the shield 20 with retainers 40. The sheet member 30 is located at an inner side of the helmet 1 with respect to the shield 20. The shield 20, the sheet member 30, and the retainers 40 form the sheet attachment structure.

The sheet member 30 is, for example, a light-adjusting sheet that changes the light transmittance of visible light in accordance with whether or not voltage is applied. The light-adjusting sheet reduces glare caused by sunlight and reflected light of the sunlight. The sheet member 30 may be an anti-fog sheet that inhibits the fogging of the shield 20 due to heat generated by application of voltage. The sheet member 30 may be a liquid crystal display device that displays characters, symbols, figures, and the like in response to an electric signal.

Sheet Attachment Structure

Figure 2:
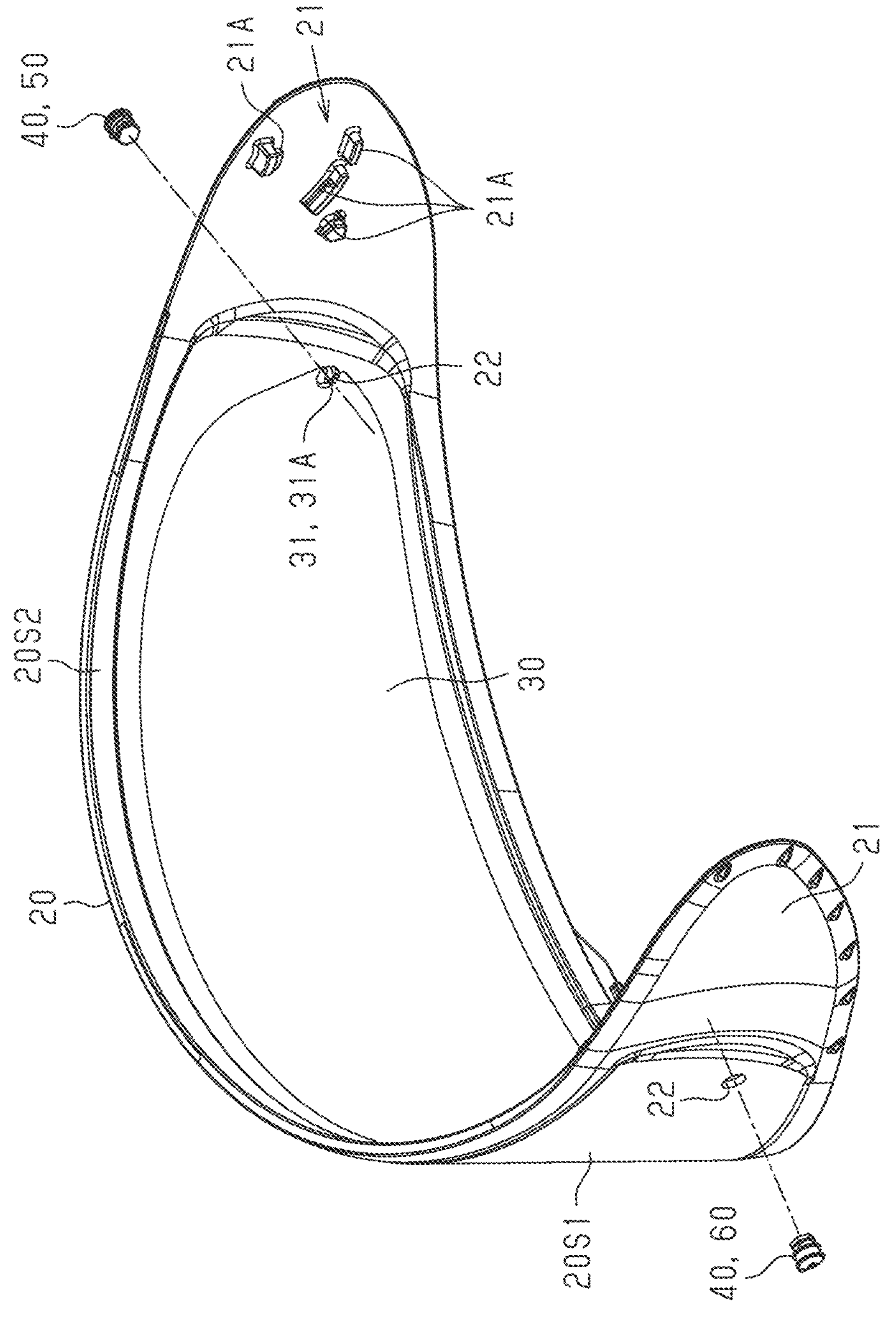
FIG. 2 is a perspective view of a sheet attachment structure.

As shown in FIG. 2, the shield 20 includes an outer surface 20S1 facing outward and an inner surface 20S2 facing the inside of the helmet body 10. Each of the attached portions 21 includes attachment pieces 21A projecting from the inner surface 20S2 toward the inside of the helmet body 10. The attachment piece 21A is a mechanism that engages a pivot mechanism arranged on the helmet body 10 to pivotally attach the shield 20 to the helmet body 10.

At each of the left end and the right end, the shield 20 includes a through hole 22 located frontward from the attached portion 21. The through hole 22 extends through the shield 20 in the thickness-wise direction. The through hole 22 is, for example, is circular. Each of the through holes 22 receives one of the retainers 40.

The sheet member 30 is attached to the inner surface 20S2 of the shield 20. The sheet member 30 is curved in conformance with the curved shape of the inner surface 20S2 of the shield 20. The sheet member 30 has a smaller contour than the shield 20. The sheet member 30 includes a recess 31 at each of the left end and the right end. The recess 31 includes a U-shaped cutaway portion. The recesses 31 respectively engage with the retainers 40 coupled to the through hole 22. Thus, the sheet member 30 is attached to the inner surface 20S2 of the shield 20. The sheet member 30 covers a portion of the inner surface 20S2 of the shield 20 located frontward from the through hole 22.

Two retainers 40 are attached to the shield 20. One of the two retainers 40 is a first retainer 50. The first retainer 50 is, for example, an insulative resin member that is integrally molded. The other one of the retainers 40 is a second retainer 60. The second retainer 60 includes two terminals electrically connected a positive electrode and a negative electrode of the sheet member 30. The second retainer 60 includes a metal part forming the terminals and a resin part insulating the terminals.

Sheet Member

Figure 3:
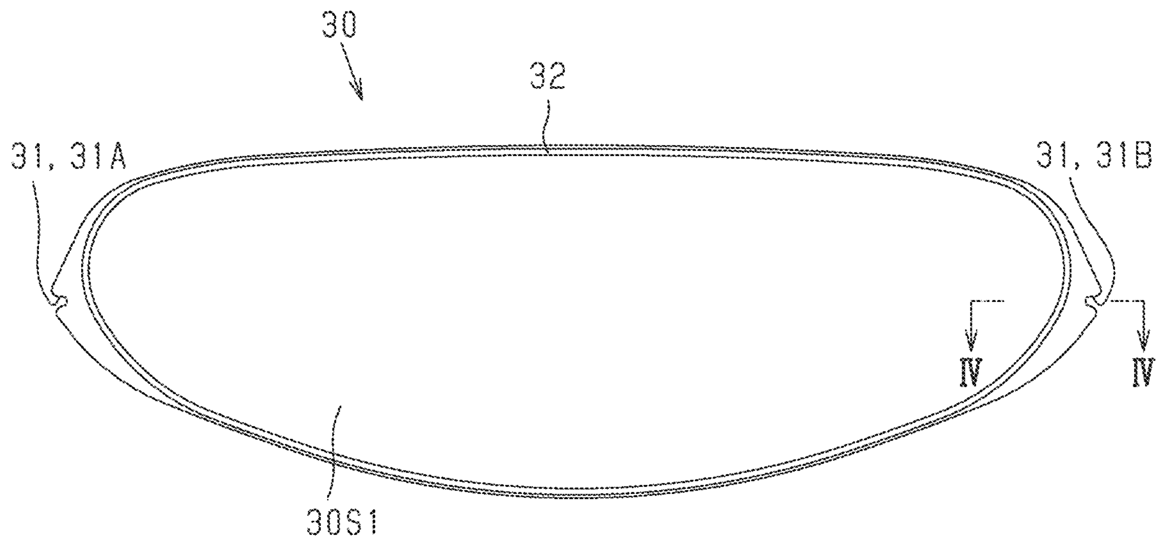
FIG. 3 is a plan view of a sheet member.

The sheet member 30 will now be described with reference to FIGS. 3 to 5. The sheet member 30 includes a first surface 30S1 opposed to the inner surface 20S2 of the shield 20. In FIGS. 3 and 5, the first surface 30S1 faces in a direction extending from the sheet of the drawing toward a person viewing the drawing.

As shown in FIG. 3, in the sheet member 30, one of the two recesses 31 is a first recess 31A. The first recess 31A engages the first retainer 50. The other one of the two recesses 31 is a second recess 31B. The second recess 31B engages the second retainer 60.

The sheet member 30 includes a sealing portion 32. The sealing portion 32 extends along the peripheral edge of the first surface 30S1 of the sheet member 30 in an endless manner. The left recess 31 is located at the left side of the sealing portion 32. The right recess 31 is located at the right side of the sealing portion 32. When the sheet member 30 is attached to the shield 20, the sealing portion 32 is in tight contact with the inner surface 20S2 of the shield 20. The sheet member 30 defines a sealed space between the sheet member 30 and the inner surface 20S2, thereby reducing the difference in temperature between the inner surface and the outer surface of the shield 20. This provides an anti-fog property.

Figure 4:
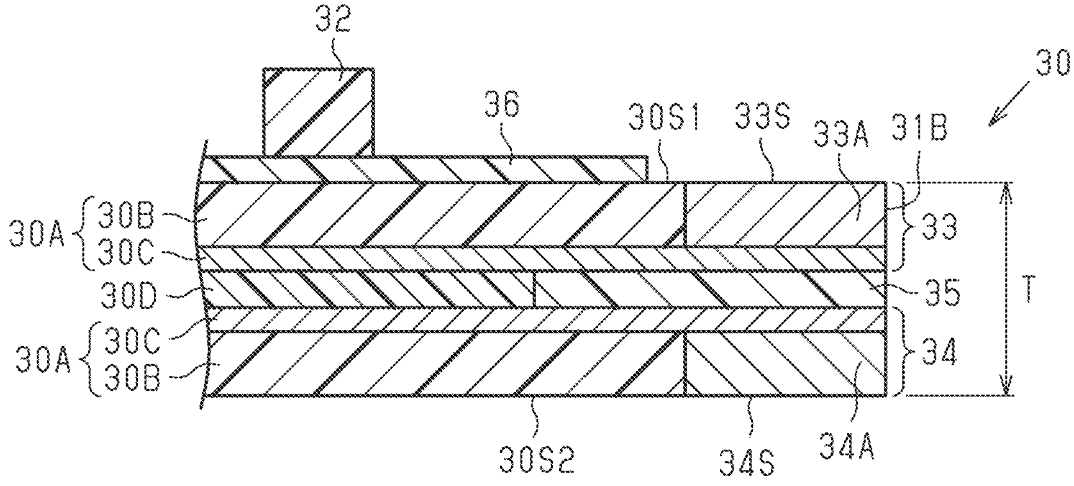
FIG. 4 is a cross-sectional view taken along line IV-IV of FIG. 3.
Figure 5:
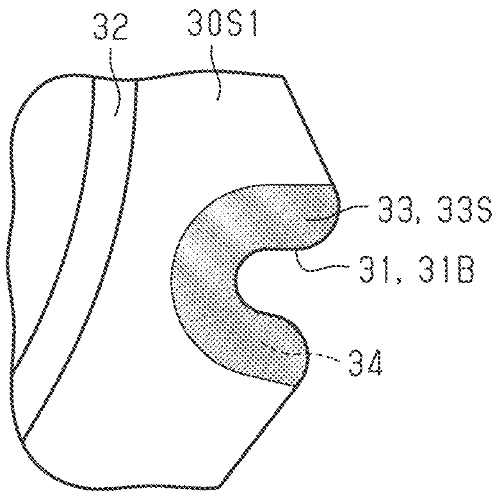
FIG. 5 is an enlarged plan view showing a second recess of the sheet member.

As shown in FIG. 4, when the sheet member 30 is the light-adjusting sheet, the sheet member 30 includes, for example, two electrode sheets 30A and a light control layer 30D. The electrode sheets 30A each include an insulative base layer 30B and a conductive electrode layer 30C. The base layer 30B is formed from, for example, a transparent resin material such as polycarbonate or polyethylenetetephthalate. The electrode layer 30C is formed from a transparent conductive material such as indium-tin-oxide or conductive polymer. The light control layer 30D is arranged between the two electrode layer 30C. The light control layer 30D includes a liquid crystal component and a polymer component that holds the liquid crystal component. The liquid crystal component held by the polymer component changes the light transmittance by changing the orientation between when voltage is applied between the two electrode layers 30C and when voltage is not applied between the two electrode layers 30C.

The sheet member 30 includes a first electrode 33, a second electrode 34, and an electrode support 35 arranged at one sideward end in the thickness-wise direction. The first electrode 33, the second electrode 34, and the electrode support 35 define the second recess 31B. The first electrode 33 is one of the positive electrode and the negative electrode of the sheet member 30. The second electrode 34 is the other one of the positive electrode and the negative electrode of the sheet member 30. The first electrode 33 and the second electrode 34 are each electrically connected to a terminal of the second retainer 60.

The first electrode 33 includes, for example, one of the two electrode layers 30C and a first plating layer 33A arranged on the electrode layer 30C. The second electrode 34 includes, for example, the other one of the two electrode layers 30C and a second plating layer 34A arranged on the electrode layer 30C. The first plating layer 33A and the second plating layer 34A include, for example, gold, silver, copper, or tin. The first electrode 33 may be a conductor that is separate from the electrode layer 30C and is electrically connected to the electrode layer 30C. Also, the second electrode 34 may be a conductor that is separate from the electrode layer 30C and is electrically connected to the electrode layer 30C. The first plating layer 33A and the second plating layer 34A may be omitted.

The first electrode 33 is arranged at the inner surface 20S2 of the shield 20 with respect to the electrode support 35. The second electrode 34 is arranged at the side opposite to the shield 20 with respect to the electrode support 35. The electrode support 35 is arranged between the first electrode 33 and the second electrode 34 in the thickness-wise direction of the sheet member 30. The electrode support 35 supports the first electrode 33 and the second electrode 34 to maintain the distance between the first electrode 33 and the second electrode 34. The electrode support 35 is, for example, formed from an insulative resin having a higher mechanical strength than the light control layer 30D.

The first electrode 33 includes a first electrode surface 33S facing the same direction as the first surface 30S1, which is opposed to the inner surface 20S2 of the shield 20. The second electrode 34 includes a second electrode surface 34S facing the same direction as the second surface 30S2, which is opposite to the first surface 30S1 of the sheet member 30. The first electrode surface 33S and the second electrode surface 34S face in opposite directions. The portion of the sheet member 30 defining the second recess 31B has a predetermined thickness T. The thickness T corresponds to the distance between the first electrode surface 33S and the second electrode surface 34S.

An anti-fog process may be performed on at least one of the first surface 30S1 and the second surface 30S2 of the sheet member 30. FIG. 4 shows an example of a structure in which an anti-fog layer 36 is arranged on the first surface 30S1 of the sheet member 30. For example, the anti-fog layer 36 may be in the form of a sheet or may be formed on the first surface 30S1 by coating or spraying.

As shown in FIG. 5, the first electrode surface 33S is arranged along the end surface of the second recess 31B to have a predetermined width. The first electrode surface 33S is, for example, horseshoe-shaped. In FIG. 5, dots are provided on a position of the sheet member 30 where the first electrode surface 33S and the second electrode surface 34S are arranged. The second electrode surface 34S and the first electrode surface 33S are identical in shape.

First Retainer

Figure 6:
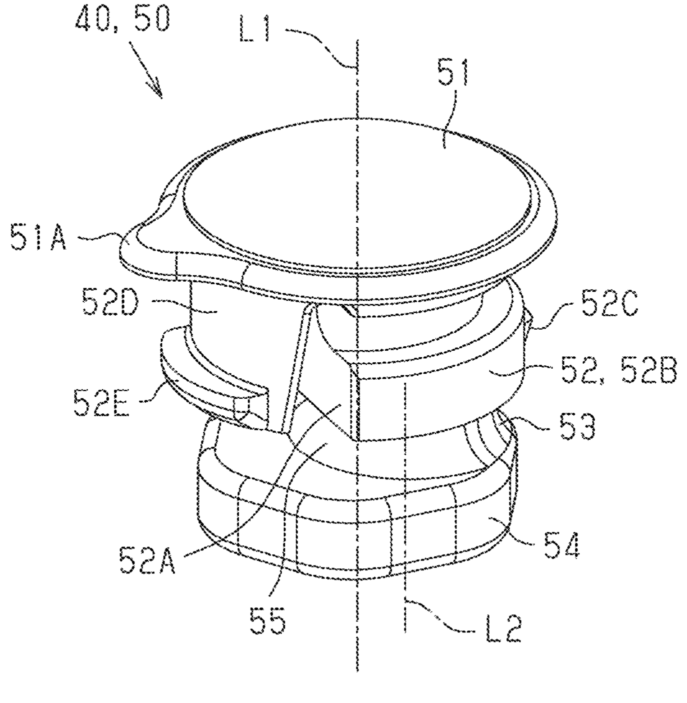
FIG. 6 is a perspective view of a first retainer.

As shown in FIG. 6, the first retainer 50 is cylindrical and extends along a center axis L1. The first retainer 50 includes a head 51, a first shaft 52, a second shaft 53, and an engaged head 54. In the first retainer 50, the head 51, the first shaft 52, the second shaft 53, and the engaged head 54 are arranged in this order along the center axis L1.

The head 51 is located at one end in a direction extending along the center axis L1. When the first retainer 50 is coupled to the shield 20, the head 51 is located outward from the outer surface 20S1 of the shield 20. The head 51 is discoid and has a larger diameter than the through hole 22 in the shield 20 about the center axis L1. The head 51 includes a marker 51A that is a portion projecting from the discoid shape in an outer circumferential direction about the center axis L1.

When the first retainer 50 is coupled to the shield 20, the first shaft 52 is fitted into the through hole 22 of the shield 20. The first shaft 52 is fitted into the through hole 22 in a rotatable manner. The first shaft 52 is cylindrical and has a diameter that is entirely smaller than or equal to the through hole 22 about the center axis L1. The first shaft 52 includes a slit 52A. The slit 52A divides the first shaft 52 into a main shaft part 52B and an elastic part 52D at a position offset from the center axis L1 toward the marker 51A.

The main shaft part 52B is larger than the elastic part 52D. The main shaft part 52B is continuous with the second shaft 53. The main shaft part 52B includes a reduced-diameter portion that is located at the head 51 and has a smaller diameter than a portion located at the second shaft 53. Thus, when the first retainer 50 is fitted into the through hole 22, the main shaft part 52B is warped and inserted into the through hole 22 in a direction extending in the center axis L1. The main shaft part 52B includes a first hook 52C projecting in the outer circumferential direction about the center axis L1. The distance between the head 51 and the first hook 52C is greater than or equal to the thickness of the shield 20 in the direction extending along the center axis L1.

The elastic part 52D has a free end and is elastically deformable so as to narrow and widen the slit 52A. The elastic part 52D includes a second hook 52E projecting from an outer edge of the free end in the outer circumference about the center axis L1. The distance between the head 51 and the second hook 52E is greater than or equal to the thickness of the shield 20 in the direction extending along the center axis L1.

When the first retainer 50 is coupled to the shield 20, the second shaft 53 projects to an inner side of the helmet body 10 from the inner surface 20S2 of the shield 20. The second shaft 53 is cylindrical and has a smaller diameter than the first shaft 52. The center of the second shaft 53 extends along an eccentric axis L2 that is parallel to the center axis L1 and is offset from the center axis L1 to the side opposite to the marker 51A. That is, the second shaft 53 is eccentrically located with respect to the first shaft 52. When the sheet member 30 is coupled to the first retainer 50, the second shaft 53 engages with the first recess 31A.

The engaged head 54 has the form of a polygonal rod having a greater width than the second shaft 53 and sized to allow insertion into the through hole 22. In an example, the engaged head 54 is substantially equal in width to the first shaft 52. The first shaft 52, the second shaft 53, and the engaged head 54 define an annular groove 55 in the circumference of the second shaft 53. The engaged head 54 includes a non-circular peripheral surface. In an example, the engaged head 54 has the form of a hexagonal rod about the center axis L1.

Figure 7:
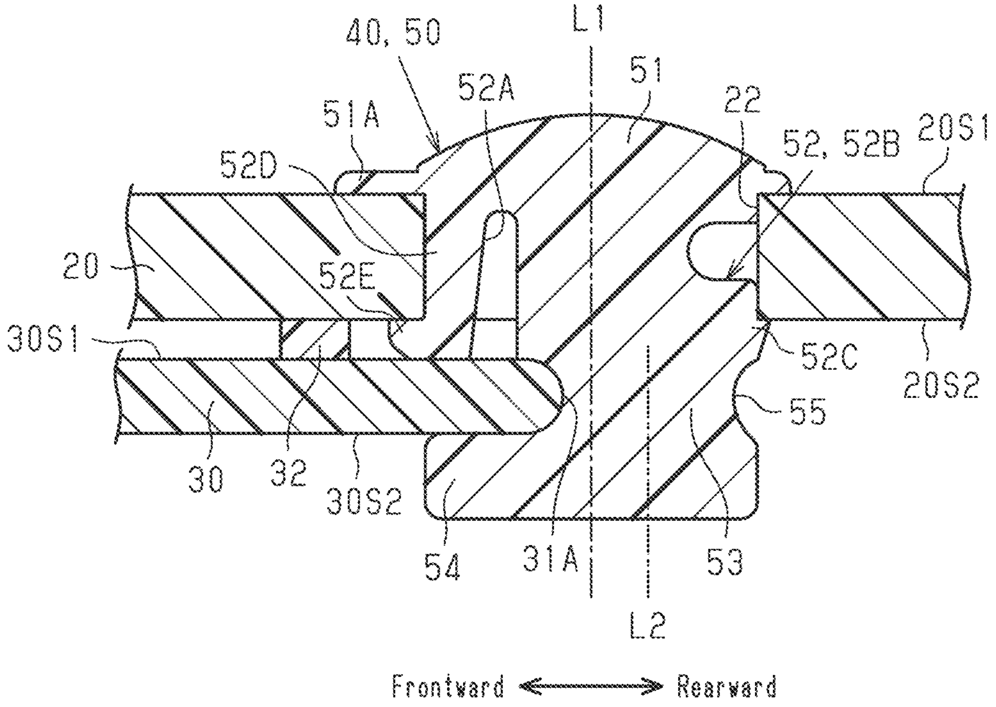
FIG. 7 is a cross-sectional view showing a state in which the sheet member is attached to a shield with the first retainer.

As shown in FIG. 7, the first retainer 50 is inserted into the through hole 22 from the side of the engaged head 54. When the first shaft 52 is fitted into the through hole 22, the first retainer 50 holds the shield 20 between the head 51 and the first hook 52C and the second hook 52E. Thus, the first retainer 50 is coupled to the shield 20. The coupling of the first retainer 50 to the shield 20 is facilitated by elastic deformation of the elastic part 52D.

The second shaft 53 and the engaged head 54 are an example of a projection projecting toward the inside of the helmet body 10 from the inner surface 20S2 when the first retainer 50 is coupled to the shield 20. The first recess 31A of the sheet member 30 is fitted into the annular groove 55 of the first retainer 50 so as to engage with the second shaft 53. In this state, the first retainer 50 is disposed so that the marker 51A is oriented frontward and the eccentric axis L2 of the second shaft 53 is located rearward from the center axis L1. The sheet member 30 is disposed so that the sealing portion 32 is opposed to the inner surface 20S2 of the shield 20.

Figure 8:
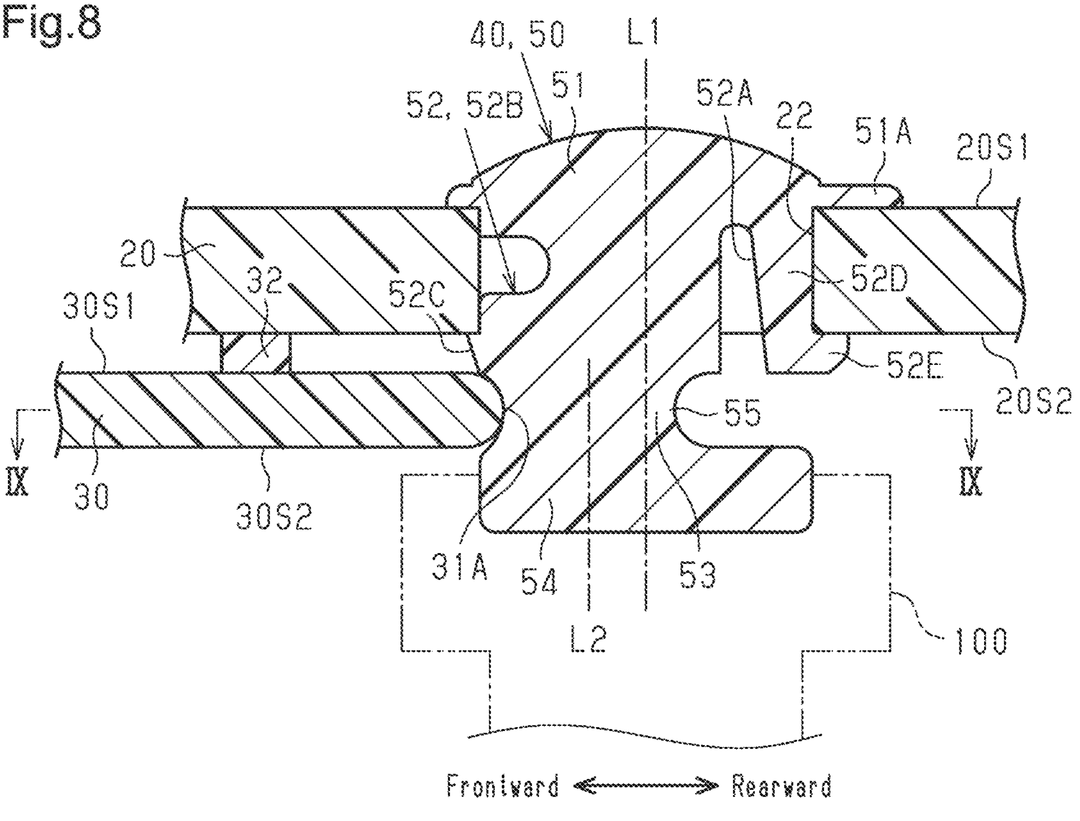
FIG. 8 is a cross-sectional view showing a state in which the first retainer is rotated 180 degrees from the state shown in FIG. 7.

As shown in FIG. 8, when the first retainer 50 is coupled to the shield 20, a tool 100 or the like may be engaged with the engaged head 54 to rotate the first retainer 50 relative to the through hole 22 about the center axis L1. The tool 100 is, for example, a wrench or a spanner. Alternatively, the first retainer 50 may be rotated by holding the engaged head 54 with fingers. When the first retainer 50 is rotated relative to the through hole 22, the second shaft 53 is rotated about the center axis L1. Thus, when the first retainer 50 is rotated, the shield 20, coupled to the first retainer 50, is movable within a range in which the second shaft 53 rotates. In FIG. 8, the first retainer 50 is rotated 180 degrees from the state shown in FIG. 7.

Figure 9:
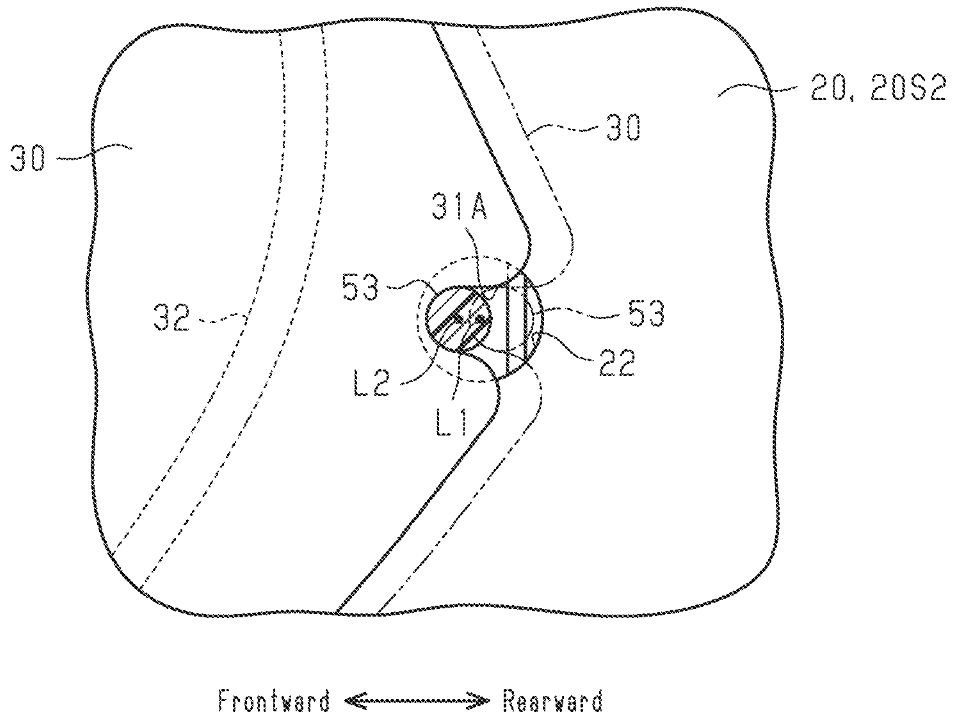
FIG. 9 is a schematic view of a cross-sectional structure taken along line IX-IX in FIG. 8.

In FIG. 9, the double-dashed line shows the sheet member 30 and the first retainer 50 shown in FIG. 7, and the solid line shows the sheet member 30 and the first retainer 50 shown in FIG. 8. As shown in FIG. 9, the first retainer 50 is rotated to shift the second shaft 53 from the state (double-dashed line) located rearward relative to the center axis 1 to the state (solid line) located frontward relative to the center axis L1. Thus, the sheet member 30 is movable frontward. This achieves sufficient pressing of the sheet member 30 toward the inner surface 20S2 of the shield 20. As a result, the tightness of the contact of the inner surface 20S2 of the shield 20 with the sealing portion 32 of the sheet member 30 is increased. In addition, the strength of pressing the sheet member 30 against the shield 20 may be changed in accordance with the degree of curvature of the shield 20. In this state, the position of the second shaft 53 is recognized based on the direction of the marker 51A even from the side of the outer surface 20S1 of the shield 20.

Second Retainer

Figure 10:
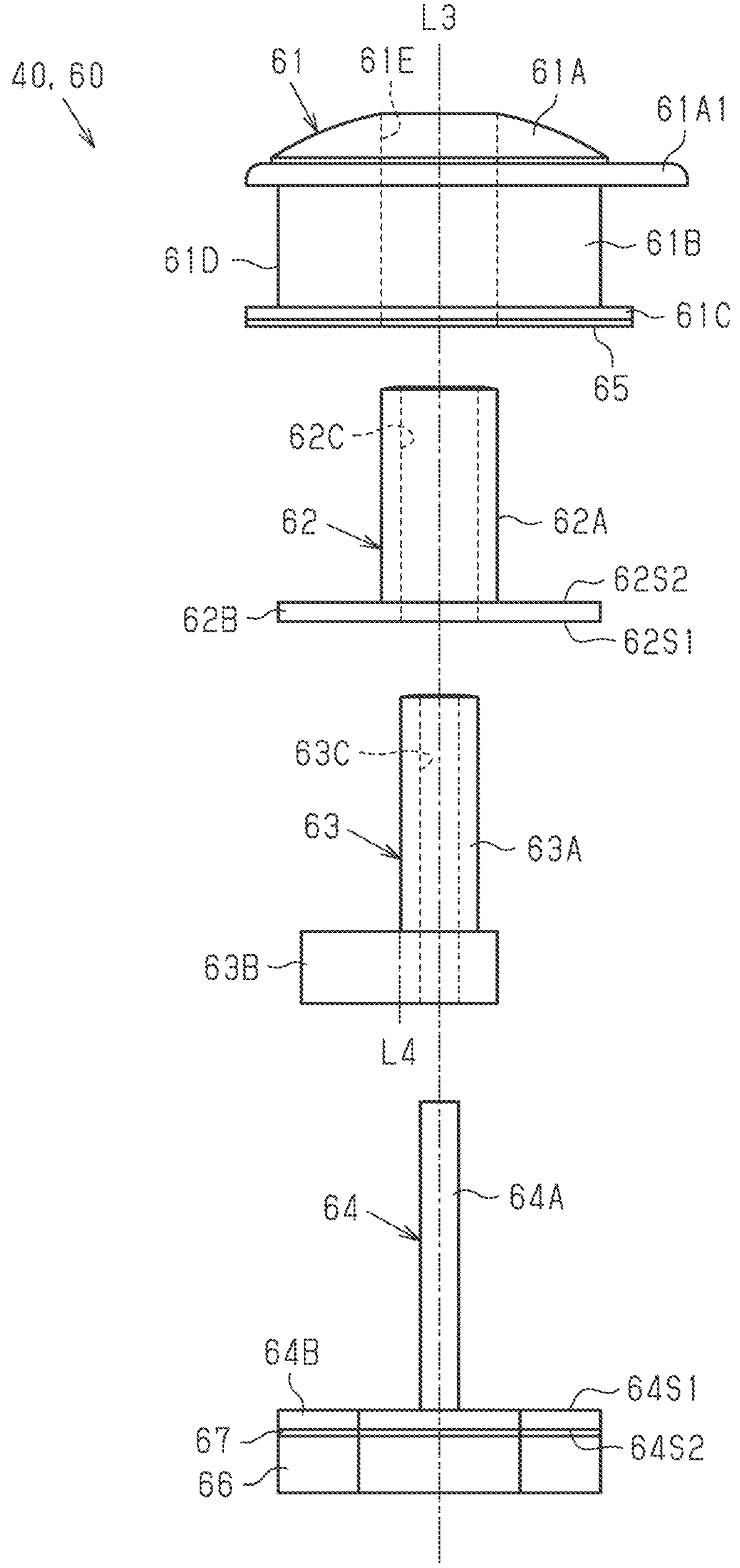
FIG. 10 is an exploded side view of components of a second retainer.

As shown in FIG. 10, the second retainer 60 includes a shaft member 61, a first terminal member 62, an insulation member 63, and a second terminal member 64. The shaft member 61 and the insulation member 63 are insulative members and are formed from, for example, thermoplastic resin. The first terminal member 62 and the second terminal member 64 are conductive members and are formed from, for example, metal such as copper, nickel, or aluminum or an alloy of such a metal. The second retainer 60 is cylindrical and entirely extends along a center axis L3. In the second retainer 60, the shaft member 61, the first terminal member 62, the insulation member 63, and the second terminal member 64 are integrally fixed to each other so that the members will not move relative to each other. In an example, the members of the second retainer 60 may be adhered to each other by an adhesive, may be integrally formed by insert molding, or may be integrally formed by engagement of recesses and projections arranged on the members.

The shaft member 61 includes a head 61A, a first shaft 61B, and a flange 61C. In the shaft member 61, the head 61A, the first shaft 61B, and the flange 61C are arranged in this order along the center axis L3. When the second retainer 60 is coupled to the shield 20, the head 61A is located outward from the outer surface 20S1 of the shield 20. The head 61A is discoid and has a larger diameter than the through hole 22 in the shield 20 about the center axis L3. The head 61A includes a marker 61A1 that is a portion projecting from the discoid shape in an outer circumferential direction about the center axis L3.

When the second retainer 60 is coupled to the shield 20, the first shaft 61B is fitted into the through hole 22. The first shaft 61B is fitted into the through hole 22 in a rotatable manner. The first shaft 61B is cylindrical and has a diameter that is smaller than or equal to the through hole 22 about the center axis L3.

The flange 61C is discoid and has a larger diameter than the through hole 22. When the second retainer 60 is coupled to the shield 20, the flange 61C is located at an inner side of the helmet body 10 from the inner surface 20S2 of the shield 20. Thus, in the shaft member 61, the head 61A, the first shaft 61B, and the flange 61C form an annular groove 61D. When the annular groove 61D engages with the through hole 22, the second retainer 60 is coupled to the shield 20.

The shaft member 61 includes a first insertion hole 61E extending through the head 61A, the first shaft 61B, and the flange 61C. The first insertion hole 61E extends along the center axis L3. The first insertion hole 61E is, for example, circular about the center axis L3 but may have any shape.

The second retainer 60 includes a first elastic support 65. The first elastic support 65 is disposed on an end of the shaft member 61 located at the flange 61C in a direction extending along the center axis L3. The first elastic support 65 is formed from a material having a lower Young's modulus than the shaft member 61 and is readily elastically deformed. The first terminal member 62 includes a first terminal 62B in contact with the first elastic support 65. The first elastic support 65 is formed from, for example, silicone rubber. The first elastic support 65 may be omitted.

The first terminal member 62 includes a first conductive shaft 62A and the first terminal 62B. The first conductive shaft 62A is, for example, cylindrical about the center axis L3. The first conductive shaft 62A is inserted into the first insertion hole 61E of the shaft member 61. The first terminal 62B is connected to one end of the first conductive shaft 62A. The first terminal 62B has the form of a low-profile disc about the center axis L3. The first terminal 62B is sized to allow insertion through the through hole 22 and has a larger diameter than the first conductive shaft 62A.

The first terminal 62B includes a first terminal surface 62S1 and a first supported surface 62S2. The first terminal surface 62S1 is a surface of the first terminal 62B located opposite from the first conductive shaft 62A. The first supported surface 62S2 is a surface of the first terminal 62B located at the first conductive shaft 62A and is opposite to the first terminal surface 62S1. When the first conductive shaft 62A is inserted into the first insertion hole 61E, the first supported surface 62S2 is in contact with the first elastic support 65. The first terminal surface 62S1 may be provided with plating of the same type as the first plating layer 33A.

The first terminal member 62 includes a second through hole 62C extending through the first conductive shaft 62A and the first terminal 62B. The second through hole 62C extends along the center axis L3. The second through hole 62C is, for example, circular about the center axis L3 but may have any shape.

The insulation member 63 includes an insulation shaft 63A and a second shaft 63B. The insulation shaft 63A is, for example, cylindrical about the center axis L3. The insulation shaft 63A is inserted into the second through hole 62C of the first terminal member 62. The second shaft 63B is cylindrical and has a diameter that is larger than that of the insulation shaft 63A and smaller than that of the first shaft 61B and the first terminal 62B. The second shaft 63B is connected to one end of the insulation shaft 63A. The center of the second shaft 63B extends along an eccentric axis LA that is parallel to the center axis L3 and is offset from the center axis L3 to the side opposite to the marker 61A1. That is, the second shaft 63B is eccentrically located with respect to the first shaft 61B. The second shaft 63B is in contact with the first terminal surface 62S1. When the sheet member 30 is coupled to the second retainer 60, the second shaft 63B engages with the second recess 31B.

The insulation member 63 includes a third insertion hole 63C extending through the insulation shaft 63A and the second shaft 63B. The third insertion hole 63C extends along the center axis L3. The third insertion hole 63C is, for example, circular about the center axis L3 but may have any shape.

The second terminal member 64 includes a second conductive shaft 64A and a second terminal 64B. The second conductive shaft 64A is, for example, cylindrical about the center axis L3. The second conductive shaft 64A is inserted into the third insertion hole 63C of the insulation member 63. The second terminal 64B is connected to one end of the second conductive shaft 64A. The second terminal 64B has the form of a low-profile polygonal rod about the center axis L3. The second terminal 64B is greater in width than the second conductive shaft 64A and the second shaft 63B and is sized to allow insertion into the through hole 22. In an example, the width of the second terminal 64B is equal to the width of the first terminal 62B. The second terminal 64B includes a non-circular peripheral surface. In an example, the second terminal 64B has the form of a hexagonal rod.

The second terminal 64B includes a second terminal surface 64S1 and a second supported surface 64S2. The second terminal surface 64S1 is a surface of the second terminal 64B located at the second conductive shaft 64A. The second supported surface 64S2 is a surface of the first terminal 62B located opposite from the second terminal surface 64S1. When the second conductive shaft 64A is inserted into the third insertion hole 63C, the second terminal surface 64S1 is in contact with the second shaft 63B of the insulation member 63. The second terminal surface 64S1 may be provided with plating of the same type as the second plating layer 34A.

The second retainer 60 includes a backing portion 66. The backing portion 66 is disposed on the second terminal 64B at the second supported surface 64S2. The backing portion 66 is formed from, for example, an insulative resin. The backing portion 66 is formed from, for example, a resin material of the same type as that forming the shaft member 61. The backing portion 66 is, for example, configured to have a thickness that is greater than the second terminal 64B. The backing portion 66 supports the second terminal 64B to prevent excessive deformation of the second terminal 64B. The backing portion 66 may be omitted.

The second retainer 60 includes a second elastic support 67. The second elastic support 67 is disposed between the second terminal 64B and the backing portion 66. The second elastic support 67 is formed from a material having a lower Young's modulus than the backing portion 66 and is readily elastically deformed. The second elastic support 67 is in contact with the second supported surface 64S2 of the second terminal 64B. The second elastic support 67 is formed from, for example, silicone rubber. The backing portion 66 and the second elastic support 67 each have, for example, the form of a hexagonal rod in the same manner as the second terminal 64B. The second elastic support 67 may be omitted.

Figure 11:
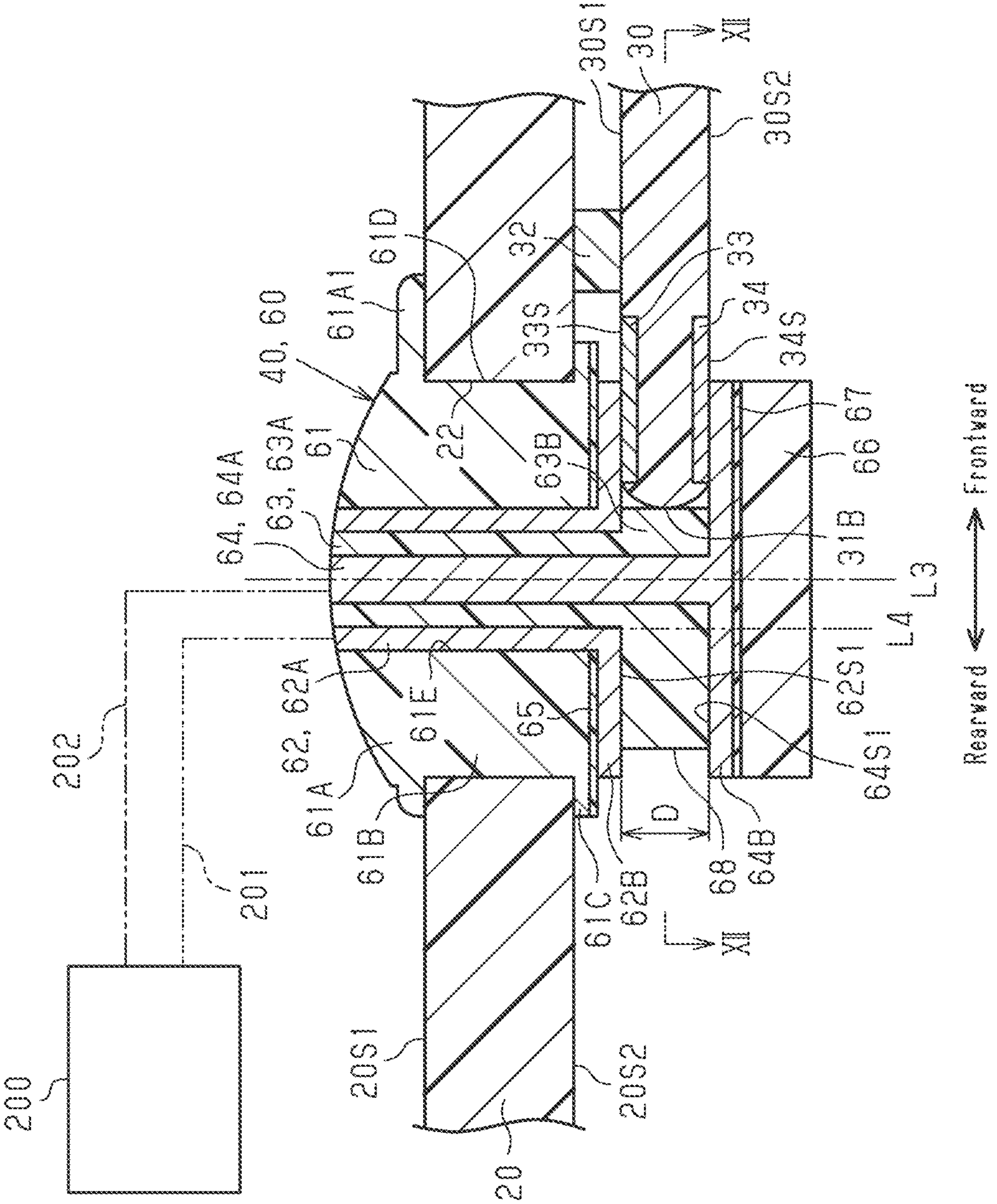
FIG. 11 is a cross-sectional view showing a state in which the sheet member is attached to the shield with the second retainer.

As shown in FIG. 11, the second retainer 60 is coupled to the shield 20 by fitting the annular groove 61D, which is formed of the head 61A, the first shaft 61B, and the flange 61C, into the through hole 22. The second retainer 60 is configured to be coupled to the shield 20 in a detachable manner. In an example, in the same manner as the first retainer 50, in the second retainer 60, the shaft member 61 may include a reduced-diameter portion so as to be readily coupled to and detached from the shield 20.

The first conductive shaft 62A, the insulation shaft 63A, and the second conductive shaft 64A extend through the first insertion hole 61E of the shaft member 61 in a direction from the inner surface 20S2 of the shield 20 toward the outer surface 20S1. The first conductive shaft 62A and the second conductive shaft 64A are insulated by the insulation shaft 63A in the first insertion hole 61E.

The first conductive shaft 62A is connected to an external power supply 200 by a first external wire 201. The second conductive shaft 64A is connected to the external power supply 200 by a second external wire 202. The external power supply 200 is, for example, a rechargeable battery such as a lithium-ion rechargeable battery mounted on the helmet body 10 but may be a primary battery. The external power supply 200 includes, for example, a switch configured to switch between a state in which power is output and a state in which power is not output. The external power supply 200 is, for example, disposed on the outer surface 20S1 of the shield 20 in the vicinity of the attached portion 21 so that a person, while wearing the helmet, can operate the switch without interfering with the field of view. When the external power supply 200 is disposed on the outer surface 20S1 of the shield 20, application of excessive external force (tensile force) to the first external wire 201 and the second external wire 202 is avoided when the shield 20 is pivoted.

The first external wire 201 and the second external wire 202 are configured to supply electric power to the sheet member 30 and are, for example, electric wires. The first external wire 201 and the second external wire 202 are disposed at an outer side of the helmet body 10 and the shield 20. Instead of being directly connected to the external power supply 200, the first external wire 201 and the second external wire 202 may be connected to, for example, a controller mounted on the outside of the helmet body 10 or the outer surface 20S1 of the shield 20. In this case, the controller is, for example, connected to the external power supply 200.

The first terminal 62B, the second shaft 63B, and the second terminal 64B are an example of a projection of the second retainer 60 projecting from the inner surface 20S2 of the shield 20 toward the inside of the helmet body 10. The second shaft 63B is sandwiched between the first terminal surface 62S1 and the second terminal surface 64S1 in the direction extending along the center axis L3. The first terminal 62B and the second terminal 64B are insulated from the second shaft 63B. The first terminal 62B, the second shaft 63B, and the second terminal 64B form an annular groove 68 in the circumference of the second shaft 63B.

The first terminal surface 62S1 and the second terminal surface 64S1 are opposed to each other. A distance D between the first terminal surface 62S1 and the second terminal surface 64S1 corresponds to the thickness of the second shaft 63B in the direction of the eccentric axis L4. In other words, the second shaft 63B serves as a spacer specifying the distance D. The distance D is less than or equal to a thickness T of a portion of the sheet member 30 forming the second recess 31B. The distance D corresponds to the width of the annular groove 68.

The second recess 31B is fitted into the annular groove 68. The second recess 31B engages the second shaft 63B. The first terminal surface 62S1 is in contact with the first electrode surface 33S. Thus, the first terminal member 62 is electrically connected to the first electrode 33. The second terminal surface 64S1 is in contact with the second electrode surface 34S. Thus, the second terminal member 64 and the second electrode 34 are electrically connected.

When the first terminal 62B contacts the first electrode 33, the first elastic support 65 is bent. Thus, the first terminal 62B is readily elastically deformed. Thus, the second recess 31B is readily fitted into the annular groove 68. In addition, the pressure of contact of the first terminal surface 62S1 with the first electrode surface 33S is increased. This increases the reliability of electrical contact of the first terminal 62B with the first electrode 33. Also, when the second terminal 64B contacts the second electrode 34, the second elastic support 67 is bent. Thus, the second recess 31B is readily fitted into the annular groove 68, and the reliability of electrical contact of the second terminal 64B with the second electrode 34 is increased. In other words, the portion of the first terminal 62B supported by the first elastic support 65 is an example of an elastic portion that elastically deforms and contacts the first electrode surface 33S. Also, the portion of the second terminal 64B supported by the second elastic support 67 is an example of elastic portion that elastically deforms and contacts the second electrode surface 34S.

In the same manner as the first retainer 50, in the second retainer 60, the tool 100 or the like is engaged with the backing portion 66 so that the second retainer 60 entirely rotates relative to the through hole 22 about the center axis L1. More specifically, when the backing portion 66 is rotated, the shaft member 61, the first terminal member 62, the insulation member 63, and the second terminal member 64 are integrally rotated. Thus, the shield 20, which is coupled to the second retainer 60, is movable within a range in which the second shaft 63B rotates. This achieves sufficient pressing of the sheet member 30 toward the inner surface 20S2 of the shield 20, thereby increasing the tightness of contact of the inner surface 20S2 with the sealing portion 32. In addition, the strength of pressing the sheet member 30 against the shield 20 may be changed in accordance with the degree of curvature of the shield 20. When formed of electric wires, the first external wire 201 and the second external wire 202 do not hamper rotation of the second retainer 60.

Figure 12:
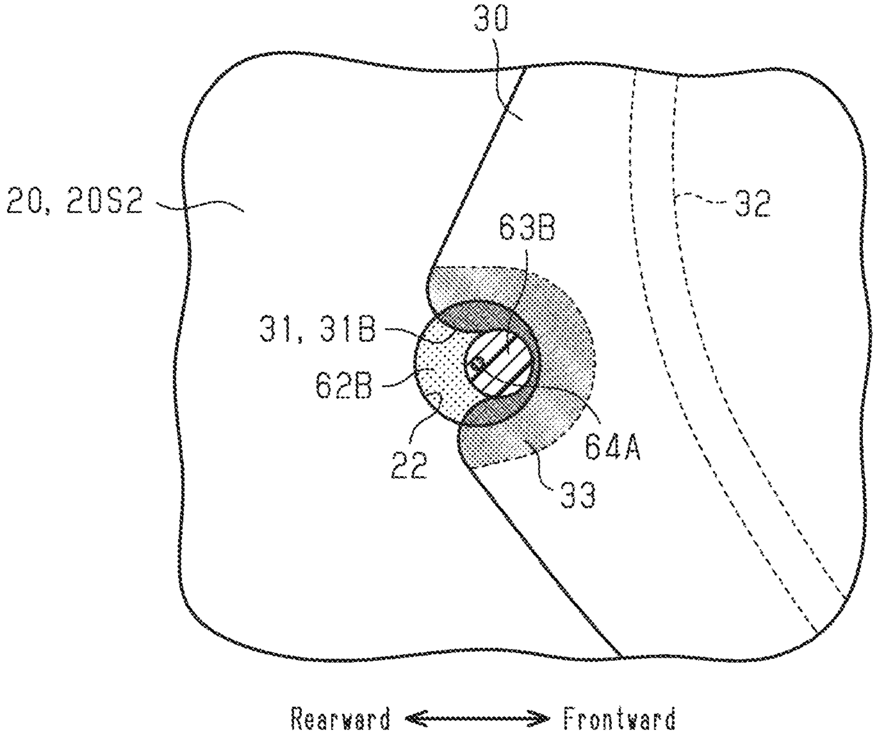
FIG. 12 is a schematic view of a cross-sectional structure taken along line XII-XII in FIG. 11.
Figure 13:
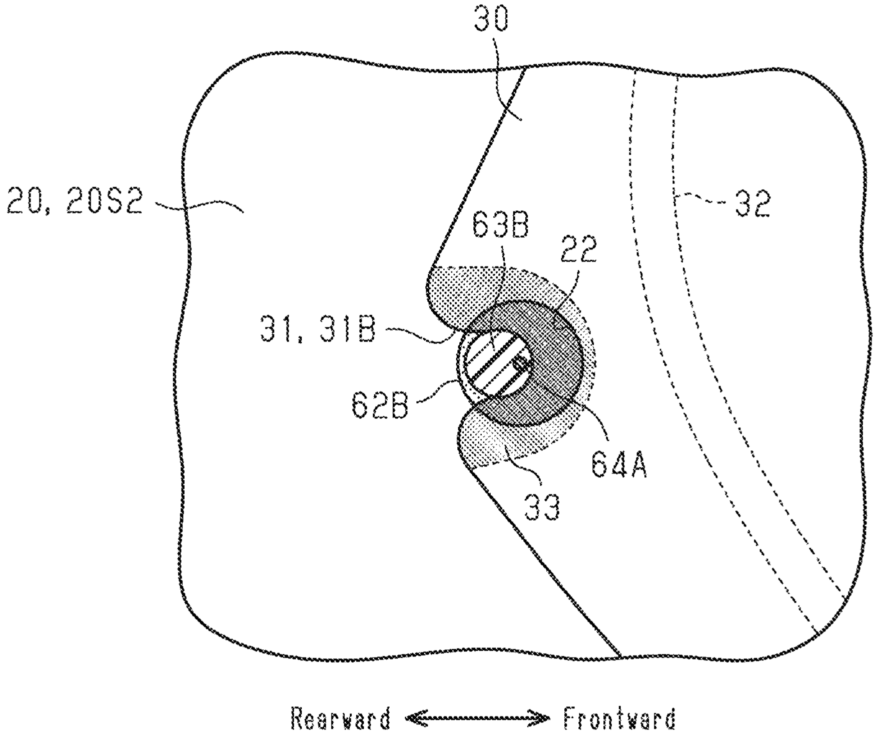
FIG. 13 is a schematic view showing a state in which the second retainer is rotated 180 degrees from the state shown in FIG. 12.

With reference to FIGS. 12 and 13, the relationship between the positions of the second shaft 63B and the sheet member 30 with the area of contact of the first electrode 33 with the first terminal 62B will be described. The second electrode 34 and the second terminal 64B are in contact with each other in the same manner as the first electrode 33 and the first terminal 62B are in contact with each other. In FIGS. 12 and 13, the first terminal 62B is indicated by sparse dots. The first electrode 33 is indicated by medium-density dots. The portion where the first terminal 62B and the first electrode 33 overlap is indicated by dense dots.

As shown in FIG. 12, when the second shaft 63B is located frontward, the portion where the first terminal 62B and the first electrode 33 overlap is relatively decreased in size. As shown in FIG. 13, when the second shaft 63B is located rearward, the portion where the first terminal 62B and the first electrode 33 overlap is relatively increased in size. In other words, when the second retainer 60 rotates, the area of the first terminal 62B overlapping the first electrode 33 changes. The size of the first electrode 33 and the first terminal 62B may be determined so that the minimum area for electrical connection of the first terminal 62B with the first electrode 33 is obtained in any rotational state of the second retainer 60.

In the process for attaching the sheet member 30 to the shield 20, before the shield 20 is attached to the helmet body 10, the two retainers 40 are coupled to the shield 20. In this process, the retainers 40 are coupled so that the markers 51A and 61A1 are oriented toward the center in the sideward direction of the shield 20. Then, the sheet member 30 is coupled to one of the retainers 40. In this state, the sheet member 30 is coupled to the other one of the retainers 40 with the shield 20 flattened out from the curved shape. Subsequently, each retainer 40 is rotated in accordance with the degree of the tightness of contact of the sheet member 30 with the shield 20 to ensure the tightness of contact of the shield 20 with the sheet member 30. The procedures described above couple the sheet member 30 to the shield 20.

Instead of the sheet member 30 having the positive and negative electrodes, a sheet having no electrodes (e.g., anti-fog sheet having a surface undergoing an anti-fog process) may be coupled to the shield 20. In this case, instead of using the second retainer 60, the first retainer 50 may be used as both of the retainers 40.

Advantages of Embodiment

The above embodiment has the following advantages.

(1) The second retainer 60 includes the first terminal 62B and the second terminal 64B. Thus, for each of the first electrode 33 and the second electrode 34, a wiring path extending from the inside to the outside of the shield 20 is realized by the single second retainer 60. This simplifies the first external wire 201 and the second external wire 202 used to supply electric power to the sheet member 30. The wiring path of the first external wire 201 or the second external wire 202 is shortened as compared to, for example, when the positive electrode and the negative electrode of the sheet member 30 are separately connected to the two retainers 40.

(2) The second shaft 63B is eccentrically located with respect to the first shaft 61B. Thus, when the second retainer 60 is rotated, the sheet member 30 is moveable within a range in which the second shaft 63B rotates. Thus, the shield 20 is in sufficiently tight contact with the sheet member 30. In addition, even when the second retainer 60 rotates relative to the through hole 22, the electrical connection of the first electrode 33 with the first terminal 62B and the electrical connection of the second electrode 34 with the second terminal 64B are maintained.

(3) The distance D between the first terminal surface 62S1 and the second terminal surface 64S1 is less than or equal to the distance from the first electrode surface 33S to the second electrode surface 34S. This ensures the contact of the first electrode surface 33S with the first terminal surface 62S1 and the contact of the second electrode surface 34S with the second terminal surface 64S1. The first elastic support 65 of the second retainer 60 facilitates the engagement of the second recess 31B of the sheet member 30 with the second shaft 63B. In addition, the pressure of contact of the first electrode surface 33S with the first terminal surface 62S1 is increased. This increases the reliability of electrical contact of the first electrode 33 with the first terminal 62B. In accordance with the increase in the pressure of contact of the first electrode surface 33S with the first terminal surface 62S1, the reaction force increases the pressure of contact of the second electrode surface 34S with the second terminal surface 64S1. Thus, the reliability of electrical contact of the second electrode 34 with the second terminal 64B is increased. Also, the second elastic support 67 of the second retainer 60 produces the same effect in the contact of the second electrode 34 with the second terminal 64B. Since the second retainer 60 includes the first elastic support 65 and the second elastic support 67, the effect is further increased.

(4) The second shaft 63B is sandwiched between the first terminal surface 62S1 and the second terminal surface 64S1. Thus, the second shaft 63B serves as a spacer that limits deformation that decreases the distance D between the first terminal surface 62S1 and the second terminal surface 64S1. Thus, the distance D is appropriately maintained.

(5) The backing portion 66 of the second retainer 60 prevents excessive deformation of the second terminal 64B. In addition, the insulative member covers the portion of the second terminal 64B that does not contribute to contact with the second electrode 34 and thus prevents short-circuiting.

MODIFIED EXAMPLES

The above embodiment may be modified as described below. The modified examples described below may be combined as long as there is no technical inconsistency.

For example, when the second terminal 64B has a large thickness, the second terminal 64B has a sufficient strength to resist excessive deformation of the second terminal 64B. In such a case, the backing portion 66 may be omitted. In this case, the second elastic support 67 is also omitted. In this structure, the second supported surface 64S2 may be covered by an insulative layer so that the second supported surface 64S2 will not be exposed to the inside of the helmet body 10.

Figure 14:
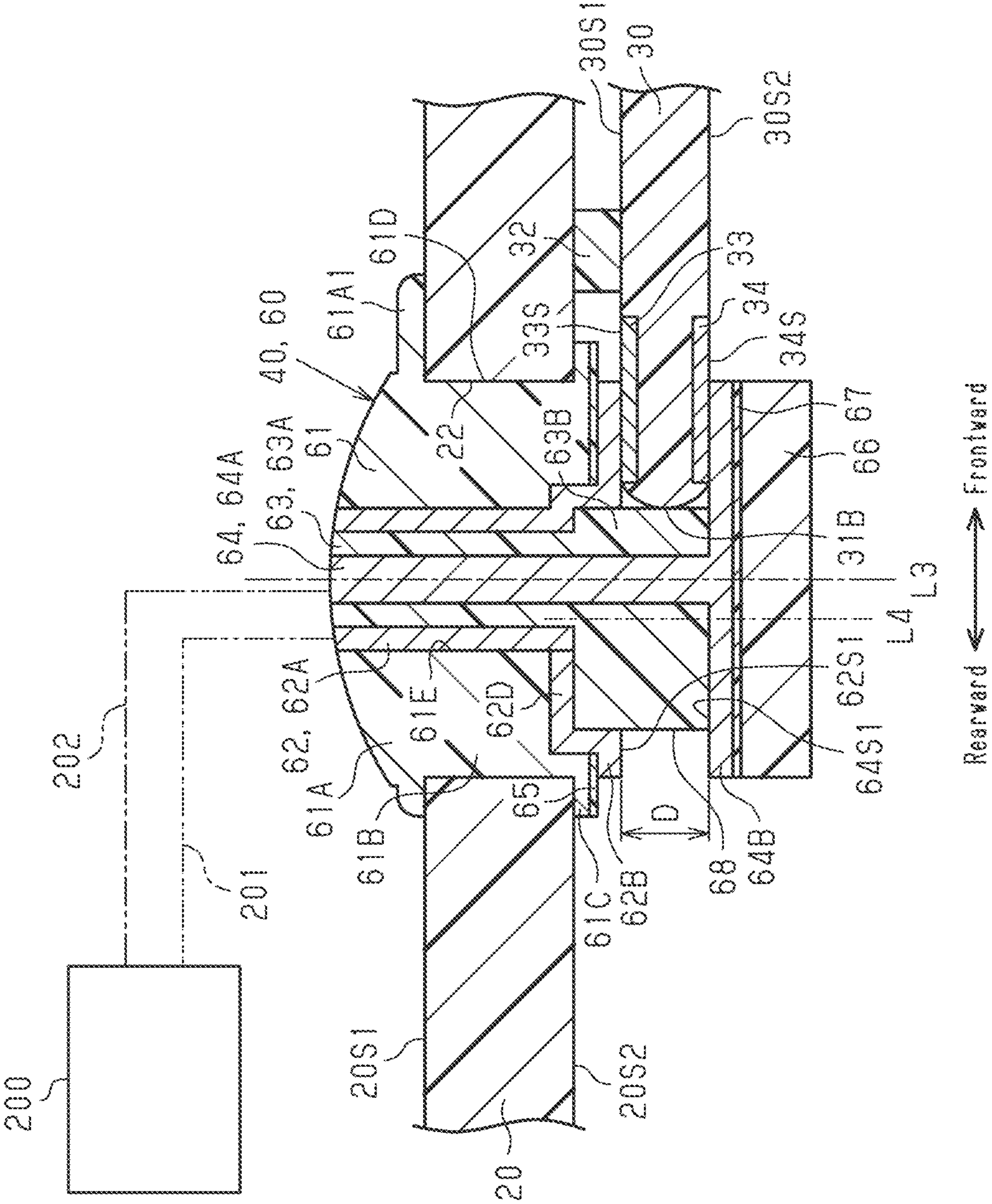
FIG. 14 is a cross-sectional view showing a modified example of a second retainer.

In the embodiment, the second shaft 63B is sandwiched between the first terminal surface 62S1 and the second terminal surface 64S1. Instead, as shown in FIG. 14, for example, in the first terminal member 62, the first terminal 62B may be arranged to abut the peripheral surface of the second shaft 63B so as to form a step 62D connecting the first conductive shaft 62A and the first terminal 62B. In this case, the second shaft 63B is sandwiched between the step 62D of the first terminal member 62 and the second terminal surface 64S1. Even with this structure, the distance D between the first terminal surface 62S1 and the second terminal surface 64S1 is appropriately maintained. In the structure in which the second shaft 63B is sandwiched between the first terminal surface 62S1 and the second terminal surface 64S1, the first terminal member 62 does not include the step 62D. Thus, the first terminal member 62 is simplified as compared to that in the structure described above. The second terminal member 64 may include a structure equivalent to the step 62D.

The second retainer 60 may include only one of the first elastic support 65 and the second elastic support 67. Even with this structure, the second recess 31B of the sheet member 30 readily engages with the second shaft 63B, and the reliability of electrical contact of the first electrode 33 with the first terminal 62B and electrical contact of the second electrode 34 with the second terminal 64B is increased.

The first terminal 62B may include a protrusion that is partially curved in the thickness-wise direction to protrude toward the first electrode surface 33S. The protrusion is formed by, for example, embossing. In this case, the protrusion of the first terminal 62B partially increases the pressure of contact with the first electrode surface 33S. Thus, the reliability of electrical contact is increased. In addition, when the first terminal 62B contacts the first electrode 33, the protrusion is bent. This allows the second recess 31B to be readily fitted into the annular groove 68. The protrusion of the first terminal 62B is an example of an elastic portion that elastically deforms and contacts the first electrode surface 33S. The protrusion may be dot-shaped, linear, or annular so as to surround the first conductive shaft 62A. The number of protrusions may be one or more. In this case, the first elastic support 65 may be omitted from the second retainer 60. In the same manner, the second terminal 64B may include a protrusion. The protrusion of the second terminal 64B is an example of an elastic portion. In this case, the second elastic support 67 may be omitted from the second retainer 60.

The first terminal 62B may include an inclined portion inclining from a portion connected to the first conductive shaft 62A in an outer circumferential direction toward the first electrode surface 33S. In this case, the distal end of the inclined portion partially increases the pressure of contact with the first electrode surface 33S. Thus, the reliability of electrical contact is increased. In addition, when the first terminal 62B contacts the first electrode 33, the inclined portion is bent. This allows the second recess 31B to be readily fitted into the annular groove 68. The inclined portion of the first terminal 62B is an example of an elastic portion that elastically deforms and contacts the first electrode surface 33S. In this case, the first elastic support 65 may be omitted from the second retainer 60. In the same manner, the second terminal 64B may include an inclined portion. The inclined portion of the second terminal 64B is also an example of an elastic portion. In this case, the second elastic support 67 may be omitted from the second retainer 60.

The first elastic support 65 and the second elastic support 67 may be omitted from the second retainer 60. In this case, the second recess 31B is press-fitted into the annular groove 68. In such a structure, the first terminal 62B and the second terminal 64B may include a projection that partially increases the thickness. The projection of the first terminal 62B partially increases the pressure of contact with the first electrode 33 and avoids an excessive increase in force needed to fit the second recess 31B into the annular groove 68. Also, the projection of the second terminal 64B partially increases the pressure of contact with the second electrode 34. The projection may be dot-shaped or linear. The number of projections may be one or more.

Instead of eccentrically locating the second shaft 63B with respect to the first shaft 61B, the center of the second shaft 63B may extend along the center axis L3. In this case, the area of contact of the first electrode 33 with the first terminal 62B and the area of contact of the second electrode 34 with the second terminal 64B is constant regardless of the direction in which the second retainer 60 is coupled to the through hole 22. Even with this structure, rotation of the first retainer 50 increases the tightness of contact of the shield 20 with the sheet member 30.

At least one of the two retainers 40 may be the second retainer 60. In an example, each of the two retainers 40 may be the second retainer 60. In this case, the first recess 31A may, but does not necessarily have to, include an electrode that differs from the first electrode 33 and the second electrode 34 and forms an electric circuit. Alternatively, instead of using the first retainer 50, the two retainers 40 may use another means to couple the end of the sheet member 30 located at the first recess 31A to the shield 20. For example, the shield 20 may be formed integrally with a holding pin that engages with the first recess 31A. Alternatively, the end of the sheet member 30 located at the first recess 31A may be adhered to the shield 20 by an adhesive. In this case, the through hole 22 located at the side of the first retainer 50 may be omitted from the shield 20. Also, the first recess 31A may be omitted from the sheet member 30.

The shape of the first terminal 62B is not limited as long as a sufficient area of contact with the first electrode 33 is obtained. In an example, the first terminal 62B may have the form of a disc having a slit. The shape of the second terminal 64B also is not limited as long as a sufficient area of contact with the second electrode 34 is obtained.

The shape of the first conductive shaft 62A is not limited as long as the first terminal 62B is connected to the first external wire 201. For example, the first conductive shaft 62A may have the form of a polygonal rod or a sheet instead of being cylindrical. The first conductive shaft 62A may be omitted from the first terminal member 62 as long as the first terminal 62B is connected to the first external wire 201. In an example, the first terminal 62B and the first external wire 201 may be electrically connected in the first insertion hole 61E. In other words, it is sufficient to electrically connect the first terminal 62B to the first external wire 201 through the through hole 22. In the same manner, the shape of the second conductive shaft 64A is not limited. The second conductive shaft 64A may be omitted from the second terminal member 64.

Figure 15:
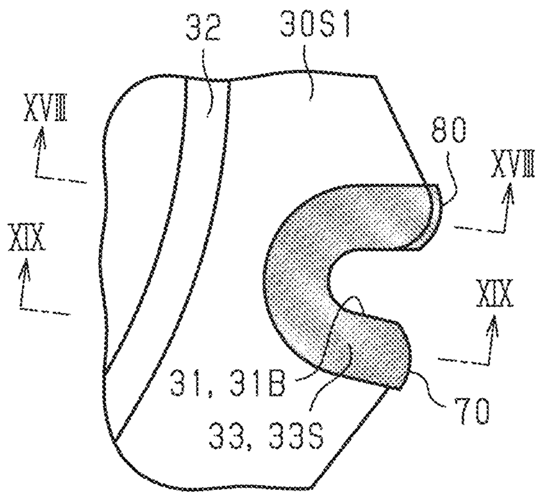
FIG. 15 is a plan view showing a modified example of a sheet member.

The structures of the first electrode 33 and the second electrode 34 are not limited to those shown in FIG. 4. A modified example of the sheet member 30 will now be described with reference FIGS. 15 to 19. As shown in FIG. 15, the sheet member 30 includes a first electrode member 70 forming the first electrode 33 and a second electrode member 80 forming the second electrode 34. The first electrode member 70 and the second electrode member 80 are formed separately from the electrode layers 30C of the sheet member 30. The first electrode member 70 is electrically connected to one of the two electrode layers 30C. The second electrode member 80 is electrically connected to the other one of the two electrode layers 30C.

Figure 16:
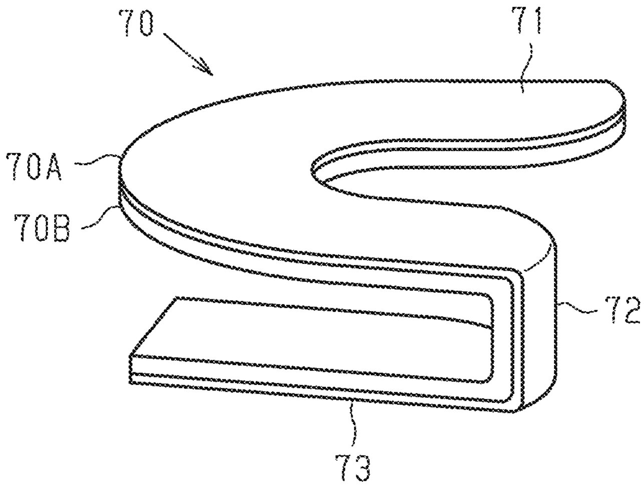
FIG. 16 is a schematic perspective view of a first electrode member.

As shown in FIG. 16, the first electrode member 70 includes a first conductive layer 70A having electrical conductivity and a first insulation layer 70B formed from resin that are stacked one on the other. The first conductive layer 70A may be, for example, a metal foil applied to the first insulation layer 70B, may be metal plated on the first insulation layer 70B, or may be metal deposited on the first insulation layer 70B by sputtering or the like.

The first electrode member 70 includes a first electrode 71, a first bent portion 72, and a first connector 73. The first electrode 71 is a portion exposed toward the first surface 30S1 of the sheet member 30. The first electrode 71 is, for example, horseshoe-shaped. The first bent portion 72 and the first connector 73 are a portion extending from one end of the first electrode 71. The border between the first electrode 71 and the first bent portion 72 and the border between the first bent portion 72 and the first connector 73 are each orthogonally bent so that the first conductive layer 70A forms a ridge section and the first insulation layer 70B forms a valley section.

Figure 17:
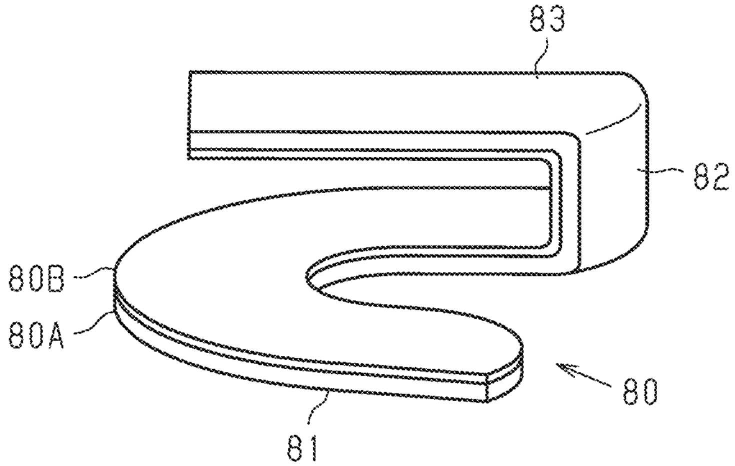
FIG. 17 is a schematic perspective view of a second electrode member.

As shown in FIG. 17, the second electrode member 80 includes a second conductive layer 80A and a second insulation layer 80B that are stacked one on the other. The second electrode member 80 and the first electrode member 70 have the same layer structure. The second electrode member 80 includes a second electrode 81, a second bent portion 82, and a second connector 83. The second electrode 81 is a portion exposed toward the second surface 30S2 of the sheet member 30. The second electrode 81 is identical in shape to the first electrode 71 and is, for example, horseshoe-shaped. The second bent portion 82 and the second connector 83 are a portion extending from one end of the second electrode 81. The border between the second electrode 81 and the second bent portion 82 and the border between the second bent portion 82 and the second connector 83 are each orthogonally bent so that the second conductive layer 80A forms a ridge section and the second insulation layer 80B forms a valley section.

Figure 18:
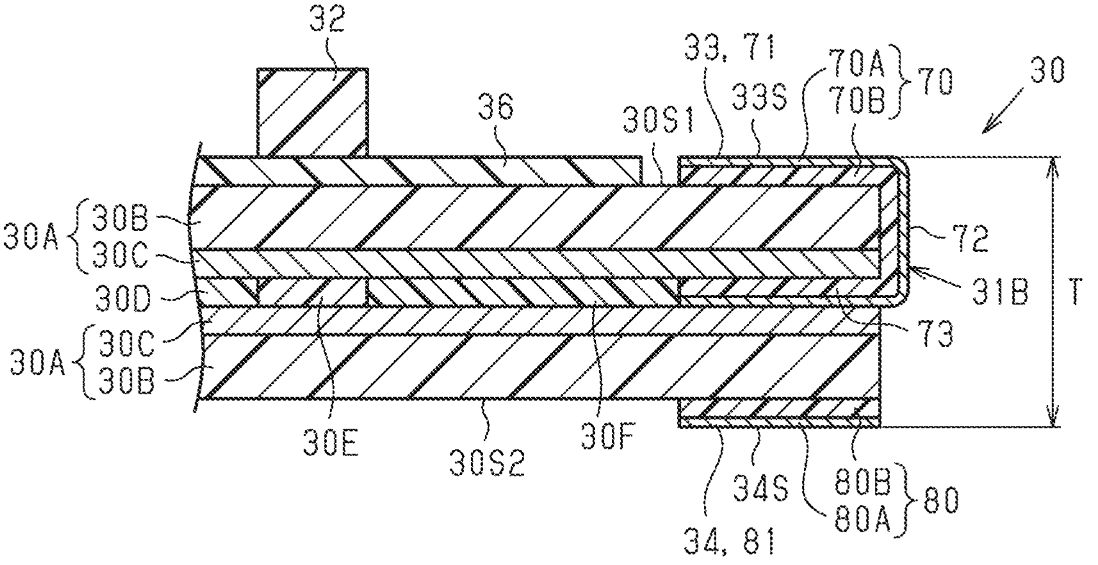
FIG. 18 is a schematic view of a cross-sectional structure taken along line XVIII-XVIII in FIG. 15.

As shown in FIG. 18, the sheet member 30 includes a sealing layer 30E and an adhesive layer 30F arranged between the two electrode layers 30C. The sealing layer 30E is, for example, an insulative resin. The sealing layer 30E is arranged on the entire circumference of an end surface of the light control layer 30D. The sealing layer 30E covers the end surface of the light control layer 30D to prevent the liquid crystal components of the light control layer 30D from being exposed to the exterior and from being deteriorated by moisture. The adhesive layer 30F is an insulative adhesive. The adhesive layer 30F increases the bonding strength of the two electrode sheets 30A.

The first electrode member 70 is bonded to the end of the electrode sheet 30A located at the first surface 30S1 by an adhesive or the like so that the first insulation layer 70B is in contact with the electrode sheet 30A. The first electrode 71 and the first surface 30S1 are located at the same side. The first conductive layer 70A of the first electrode 71 includes the first electrode surface 33S. The first bent portion 72 is located on the end surface of the sheet member 30 to define the second recess 31B. The first connector 73 is arranged between the two electrode layers 30C. The first conductive layer 70A of the first connector 73 is electrically and mechanically connected to the electrode layer 30C of the electrode sheet 30A located at the second surface 30S2 by, for example, a conductive adhesive.

Figure 19:
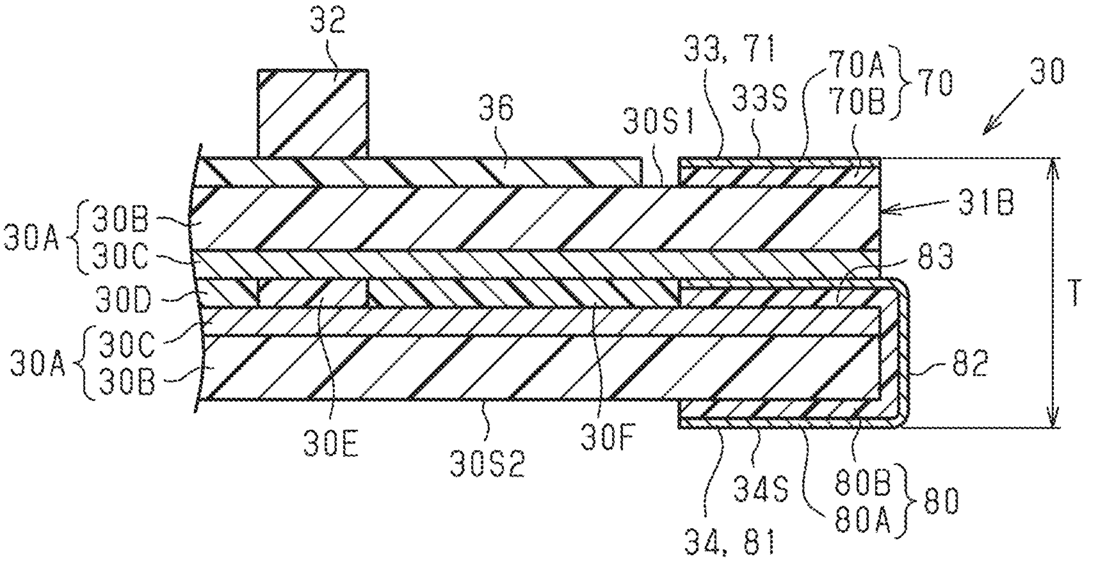
FIG. 19 is a schematic view of a cross-sectional structure taken along line XIX-XIX in FIG. 15.

As shown in FIG. 19, the second electrode member 80 is bonded to the end of the electrode sheet 30A located at the second surface 30S2 by an adhesive or the like so that the second insulation layer 80B is in contact with the electrode sheet 30A. The second electrode 81 and the second surface 30S2 are located at the same side. The second conductive layer 80A of the second electrode 81 includes the second electrode surface 34S. The second bent portion 82 is located on the end surface of the sheet member 30 to define the second recess 31B. The second connector 83 is arranged between the two electrode layers 30C. The second conductive layer 80A of the second connector 83 is electrically and mechanically connected to the electrode layer 30C of the electrode sheet 30A located at the first surface 30S1 by, for example, a conductive adhesive. As described above, even when the first electrode member 70 and the second electrode member 80 are formed separately from the electrode layers 30C of the sheet member 30, the first electrode 33 and the second electrode 34 of the sheet member 30 are formed.

It is sufficient that the helmet 1 includes the shield 20. The helmet may be, for example, a flip-up helmet with a liftable chin portion, an open-face helmet, a helmet with a removable chin portion, or a convertible helmet where the chin portion pivots and locks into place at the back of the helmet.

The invention claimed is:

1. A sheet attachment structure, comprising:
- a shield configured to be attached to a helmet body;
- a sheet member covering an inner surface of the shield; and
- a retainer configured to attach the sheet member to the shield, wherein:
- the shield includes a through hole to which the retainer is coupled,
- the sheet member includes:
  - a recess engaging with the retainer, and
  - a first electrode and a second electrode,
- the first electrode and the second electrode are arranged on opposite sides of the sheet member in a thickness-wise direction of the sheet member on a periphery of the recess so as to sandwich the sheet member,
- the first electrode includes a first electrode surface,
- the second electrode includes a second electrode surface,
- the first electrode surface and the second electrode surface face in opposite directions,
- the retainer includes:
  - a first shaft fitted into the through hole,
  - a first terminal in contact with the first electrode surface,
  - a second terminal opposed to the first terminal and in contact with the second electrode surface, and
  - a second shaft disposed between the first terminal and the second terminal and engaging with the recess,
- the first terminal is configured to be electrically connected through the through hole to a first external wire located outside the shield, and
- the second terminal is configured to be electrically connected through the through hole to a second external wire located outside the shield.

2. The sheet attachment structure according to claim 1, wherein:
- the first shaft is fitted into the through hole in a rotatable manner,
- the second shaft is eccentrically located with respect to the first shaft, and
- the retainer is configured so that the first shaft, the first terminal, the second terminal, and the second shaft integrally rotate.

3. The sheet attachment structure according to claim 1, wherein:
- the first terminal includes a first terminal surface in contact with the first electrode surface,
- the second terminal includes a second terminal surface opposed to the first terminal surface and in contact with the second electrode surface,
- a distance between the first terminal surface and the second terminal surface is less than or equal to a distance between the first electrode surface and the second electrode surface, and
- the first terminal includes an elastic portion that elastically deforms and contacts the first electrode surface.

4. The sheet attachment structure according to claim 3, wherein the second shaft is sandwiched between the first terminal surface and the second terminal surface in a direction extending along a center axis of the retainer.

5. The sheet attachment structure according to claim 1, wherein the retainer includes an insulative backing portion in contact with a surface of the second terminal located opposite from the second shaft.

6. A helmet, comprising:
- a helmet body;
- a shield attached to the helmet body;
- a sheet member covering an inner surface of the shield;
- a retainer configured to attach the sheet member to the shield; and
- a first external wire and a second external wire configured to supply electric power to the sheet member, wherein:
- the shield includes a through hole to which the retainer is coupled,
- the sheet member includes:
  - a recess engaging with the retainer, and
  - a first electrode and a second electrode,
- the first electrode and the second electrode are arranged on opposite sides of the sheet member in a thickness-wise direction of the sheet member on a periphery of the recess so as to sandwich the sheet member,
- the first electrode includes a first electrode surface,
- the second electrode includes a second electrode surface,
- the first electrode surface and the second electrode surface face in opposite directions,
- the retainer includes:
  - a first shaft fitted into the through hole,
  - a first terminal in contact with the first electrode surface,
  - a second terminal opposed to the first terminal and in contact with the second electrode surface, and
  - a second shaft disposed between the first terminal and the second terminal and engaging with the recess,
- the first external wire and the second external wire are located outside the shield,
- the first terminal is electrically connected through the through hole to the first external wire, and
- the second terminal is electrically connected through the through hole to the second external wire.

7. The sheet attachment structure according to claim 1, wherein:
- the first terminal in contact with the first electrode surface, the first electrode surface of the first electrode, the second electrode surface of the second electrode, and the second terminal in contact with the second electrode surface are arranged in sequence.

* * * * *